Patented Aug. 23, 1938

2,128,127

UNITED STATES PATENT OFFICE 2,128,127

RUBBER AND METHOD OF MAKING THE SAME

Albert K. Epstein and Benjamin R. Harris, Chicago, Ill., assignors to Colgate-Palmolive-Peet Company, Jersey City, N. J., a corporation of Delaware No Drawing. Original application January 28, 1935, Serial No. 3,802. Divided and this application January 28, 1937, Serial No. 122,875

20 Claims. (Cl. 18—50)

Our invention relates to an improved rubber product and process of producing the same.

The principal object of the invention is the production of an improved rubber composition.

Another object is the provision of an improved method for producing rubber articles, particularly in the milling and mixing of the rubber magma.

Another object is to avoid difficulties encountered heretofore in the preparation of rubber goods.

Other objects are to cut down the milling time, to produce a better rubber product, to introduce greater proportions of reclaimed rubber or old rubber scrap, or discards, trimmings, and a relatively smaller proportion of new rubber crepe without sacrificing quality, and to obtain more uniform distribution of fillers and similar substances throughout the rubber mass.

Other objects and advantages of the invention will appear from the detailed description.

Generally speaking, our process is applicable to the manufacture of rubber materials and rubber articles made from any type of rubber mix employing rubber. It has an advantage, however, in rubber mixes of the type wherein raw rubber such as crepe rubber is mixed with old rubber, fillers, coloring matter and the like. Our process is applicable also in the production of rubber articles manufactured from latex, wherein the addition substances described later act as dispersing agents, and our process is also applicable in rubber cements and in rubber solutions in organic solvents used for spreading on cloth.

Our process and product utilize certain addition agents, the nature of which will be pointed out hereinafter, by the proper use of which great advantages are secured and the objects of the invention attained.

The addition agents which we employ are organic substances which contain at least one lipophile group of relatively high molecular weight and at least one hydrophile sulphate group, said groups being linked together through a polyhydroxy substance. The sulphate group may be neutralized with mineral bases or ammonia to form alkaline salts, or they may be neutralized with amines such as relatively low molecular weight alkylol amines.

Our addition agents may be regarded as high molecular weight aliphatic, aromatic, or cycloaromatic derivatives of polyhydroxy substances having at least one relatively high molecular weight lipophile group in the molecule and at least one hydroxy group esterified with sulphuric acid or other sulphating compounds. The derivatives of the polyhydroxy substances may be relatively high molecular weight fatty acid esters or ethers of polyhydroxy substances such as glycerine, glycols, or poly-compounds thereof such as polyglycerols, diethylene glycol, sugars, sugar alcohols such as mannitol and sorbitol and the like. Examples of this type of material are a mixture of cocoanut fatty acid esters of diethylene glycol in which one hydroxy group of the diethylene glycol is esterified with sulphuric acid neutralized to form the alkali or amine salts thereof such, for example, as the ammonium or ethanol amine salts; monostearine sulphate (alkaline salt) and cottonseed oil fatty acid esters of glycerine wherein at least one hydroxy group of the glycerine is esterified with sulphuric acid and neutralized; cetyl alcohol ether of ethylene glycol sulphate (alkaline salt) or mixtures of lauryl and myristyl alcohol ethers of glycerol sulphate neutralized with ethanol amine and other amines, or naphthenic acid ester of glycerine sulphate (salt).

In the preparation of substances for use with the present invention, it is not necessary to carry on the processes so that pure substances are produced. Not only can we use mixtures of the various substances noted, but very often mixtures seem to produce somewhat better results than the pure substances. For example, instead of preparing relatively pure fatty acids, we may use various mixtures of fatty acids derived from vegetable and animal oils and fats, such as peanut oil, cottonseed oil, corn oil, sesame oil, lard, oleo oil, cocoanut oil, fish oils of various types, such as sardine oil, cod liver oil, naphthenic acids and the like; the mixture of fatty acids being esterified with a polyhydroxy substance, for example, glycerine, glycols or poly-compounds thereof, to produce a mixture of esters having free hydroxy groups. These esters are then esterified with sulphuric acid or treated otherwise to produce an ester of sulphuric acid at one or more free hydroxy groups to produce the mono- or di-sulphate. These substances are then preferably neutralized with an alkaline material such as sodium or potassium hydroxide, ammonia, or a suitable amine such as mono-, di-, or triethanolamine. Other amines such as methyl amine, ethyl amine, trimethyl amine, benzyl amine, propyl amine, amyl amine and others may be used.

We may produce mixtures of our substances by direct re-esterification of a suitable oil or fat which may be of animal or vegetable origin. For example, we may re-esterify fish oil with glycerine or with polyglycerols to produce a mixture of esters having at least one free hydroxy group and then treat the reaction mixture with a suitable sulphating agent such as sulphuric acid and the like under proper conditions of time and temperature to produce either the mono- or di-sulphate ester or other derivative of the mixture of various substances. This mono- or di-sulphate mixture is neutralized with a suitable base, the amount employed being calculated on the basis of the amount of sulphating agent employed.

A particular type of product with which we have had unusually good results is one prepared by re-esterifying fish oils to produce a mixture of mono- and diglycerides, then sulphating the resultant product at a low temperature to sulphate the hydroxy group, and then neutralizing with ammonia gas. With this type of material we can produce valuable commercial products in which only 20 parts of new rubber are employed for 100 parts of final product, the balance comprising scrap or reclaimed rubber such as rubber cuttings, trimmings and the like.

When a mixture of various fatty acid esters of the polyhydroxy substance having at least one free hydroxy group is treated to form the sulphate derivative in the manner pointed out previously, it is not essential that all of the esters present in the mixture have at least one hydroxy group esterified with a sulphate radical. A considerable amount of the intermediate mono- or di-ester with free OH groups may be allowed to remain without materially affecting the suitability of the product for use in a rubber mix. Indeed, the fatty acid esters having free unesterified hydroxy groups themselves have an effect when employed as addition agents in rubber not dissimilar to the effect imparted to the rubber by the use of the sulphate substances described herein. For many purposes, a mixture of esters having free hydroxy groups and esters in which the hydroxy groups are esterified with or replaced by a sulphate radical produce better results than either one of these substances mentioned when used alone.

As an example of the manner in which our invention is carried out, we take, for example, a small amount of an oily liquid composed essentially of the sulphated mono-ester of cocoanut oil fatty acids and diethylene glycol neutralized with ethanolamine and introduce the same into crepe rubber and mill the same until a plastic master mass is produced, to portions of which rubber scrap, trimmings, fillers and the like may be added to produce the final rubber product. We may also introduce a small amount of the same addition product, about 6 oz. into a batch consisting of 25 pounds of milled crepe rubber and (added to the same during milling) about 60 pounds of rubber scraps such as trimmings, cuttings, old rubber, and the like, and about 15 pounds of a suitable clay filler, antioxidants, accelerators, coloring matter, until a plastic mass is obtained. When this plastic mass has been produced, it is calendered in the usual manner to produce sheets and vulcanized with sulphur chloride vapor to produce a rubber composition from which various types of articles can be made. Sulphur may be added to the mix in the usual amount and the rubber mix vulcanized in the usual manner. Molded articles may be thus produced. This method of mixing and the general formula are illustrative because our addition substances may be used to advantage with substantially any type of rubber mix made and used commercially.

We have discovered that by using small amounts of the substances of our invention, say between three and eight ounces thereof for every hundred pounds of rubber product, a considerable amount of improvement is obtained and a greater amount of rubber trimmings may be used in proportion to new rubber without deleteriously affecting the character of the final vulcanized product. When the substances of our invention are employed for making sheet rubber, the vulcanized sheet product has less pin holes than the same product produced without our addition substances. The finished sheet has a certain softness and fullness to the feel. This effect takes place apparently because the rubber mass incorporates less air when our substances are used and a better contact is made between each particle of filler and old rubber with the general rubber magma, thus preventing an excess of absorbed air in the particles of rubber.

Our addition agents also have an interface modifying function when used in a rubber mix and they facilitate the dispersion of coloring matter, pigments, anti-oxidants, and other substances used in the rubber mix. They improve the calendering and milling, and increase the snap, feel, softness and resiliency of the rubber product. Stearic acid which is used in certain rubber formulae in large percentages may be partially or entirely eliminated. Those of our substances which are neutralized with ammonia and amines also act as accelerators and on account of their lipophile group are in intimate contact with the rubber; thus a portion of other accelerators may be eliminated.

By our invention, a certain saving is obtained in new rubber in a rubber batch, even though the addition agent is employed in proportions as small as four to six ounces of addition agent per one hundred pounds of rubber. As an example, if a batch is milled containing ten pounds of master rubber (50% new rubber and 50% zinc oxide), and five pounds of clay, then about 75 pounds of scrap such as trimmings and the like may be added with an additional ten pounds of new rubber to produce a milled product containing other addition agents (antioxident, accelerator, etc.) which may afterward be calendered into rubber sheeting. With this particular character of formula, cocoanut fatty acid mono esters of diethylene glycol sulphate (neutralized with an alkylolamine) produces unusually good results. If our addition agent is omitted in the example given, then approximately forty pounds of additional new rubber must be used to obtain comparable results. The use of the addition agent results in the production of a product characterized by a soft feel and desirable fullness. When clay is used as a filler, our addition agents obviate the rattling of the final rubber sheets and reduce pin holes. When the particular rubber mix product is rolled, they also facilitate sticking of the rubber in cutting and joining two sheets together.

Many of the substances which we employ in our present invention reduce appreciably the spattering of margarine during frying when said margarine is an emulsion of the usual oleaginous material with milk. In such substances a state of "balance" exists between the lipophile and hydrophile portion of the molecule. For many purposes, and particularly in certain types of rubber mix, these anti-spattering substances exhibit properties of unusual value, and are in general preferred over other substances which will not function potently as anti-spattering agents.

We may represent a large class of our substances by the general formula $R_v$—$X_n$—$Y_w$ wherein "R" is a lipophile alkyl, or acyl radical with at least 8 carbon atoms, "X" is the residue of a polyhydroxy substance, "Y" is a neutralized sulphuric acid radical, and "$v$", "$n$" and "$w$" are relatively small integers.

We may also represent many of the compounds of our invention by the general formula:

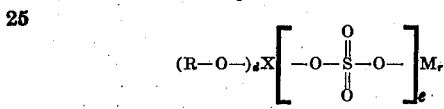

Where the cation is di- or polyvalent, many of the substances of our invention may be designated by the following formula:

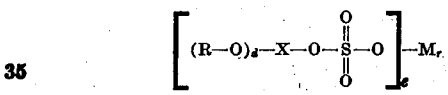

We employ the term "rubber" in the claims to include natural and synthetic rubber, gutta percha, balata and the like. The term "filler" is used in a broad sense to include not only substances which have the sole function of fillers, such as clay and carbon black, but also such substances as those which may also have another function, for example, to impart color.

We have described our invention somewhat in detail to permit those skilled in the art to practice the same, and have indicated preferred embodiments and outstanding advantages from the use of our products. Many other specific products besides those specifically mentioned and given by way of example can be employed with good results, and many advantages are obtainable both in the manufacture and character of the final rubber product. The advantages particularly described are obtained in substantially all types of rubber manufacture, but it will be understood that special advantages often are obtained when special types of rubber mixes are used. We, therefore, do not limit our invention, except within the scope of the appended claims.

The present application is a division of our previously filed application Serial No. 3,802, filed January 28, 1935.

What we claim as new and desire to protect by Letters Patent of the United States is:

1. A rubber composition including rubber and a relatively small proportion of an improving agent having the general formula $$R_v\text{—}X_n\text{—}Y_w$$

wherein R is an alkyl or acyl radical with at least eight carbon atoms, X is the residue of an aliphatic polyhydroxy substance, Y is a sulphuric acid radical, and $v$, $n$ and $w$ are relatively small integers.

2. The composition described in claim 1 wherein the sulphuric acid radical is at least partially neutralized.

3. The composition described in claim 1 wherein the sulphuric acid radical is neutralized at least in part with an alkaline material of the class consisting of amines and alkylolamines.

4. The composition described in claim 1 wherein R contains between twelve and eighteen carbon atoms.

5. A rubber composition including rubber and a relatively small proportion of an improving agent in the form of an aliphatic polyhydroxy substance wherein the hydrogen of at least one hydroxy group is replaced by an alkyl or acyl radical containing at least eight carbon atoms, and the hydrogen of another hydroxy group of said polyhydroxy substance is replaced by a sulphate radical.

6. A rubber composition including rubber and a relatively small proportion of an improving agent in the form of an aliphatic polyhydroxy substance wherein the hydrogen of at least one hydroxy group is replaced by an acyl radical containing at least twelve carbon atoms, and the hydrogen of at least one hydroxy group of said polyhydroxy substance is replaced by a neutralized sulphate radical.

7. The composition described in claim 5 wherein the sulphate radical is neutralized with an alkaline material of the class consisting of amines and alkylolamines.

8. The composition described in claim 6 wherein the sulphate radical is neutralized with an alkaline material of the class consisting of amines and alkylolamines.

9. A rubber composition including rubber and a relatively small proportion of an improving agent in the form of a relatively high molecular weight ester of glycerine wherein the hydrogen of at least one hydroxy group of the glycerine is replaced by a sulphate radical.

10. A rubber composition including rubber and a relatively small proportion of an improving agent in the form of a relatively high molecular weight ester of a glycol wherein the hydrogen of one hydroxy group of the glycol is replaced by a sulphate radical.

11. The composition described in claim 10 wherein the sulphate radical is neutralized.

12. The method of improving a rubber composition which comprises milling into said rubber composition a relatively small proportion of an addition substance having the general formula $$R_v\text{—}X_n\text{—}Y_w$$

wherein R is an alkyl or acyl radical with at least eight carbon atoms, X is the residue of an aliphatic polyhydroxy substance, Y is a neutralized sulphate radical, and $v$, $n$ and $w$ are relatively small integers.

13. A rubber composition including rubber and a relatively small proportion of an improving agent in the form of a chemical compound having the general formula $$R_v\text{—}X_n\text{—}Y_w$$

wherein R is a relatively high molecular weight alkyl or acyl radical, X is the residue of a polyhydroxy substance of the class consisting of glycerine, glycols, polyglycerols, polyglycols, sugars, and sugar alcohols, Y is a sulphate radical, and $v$, $n$ and $w$ are relatively small integers.

14. The composition described in claim 13 wherein R is an acyl radical containing between 12 and 18 carbon atoms, and wherein the sulphate radical is neutralized with an alkaline material of the class consisting of amines and alkylolamines.

15. A rubber composition including rubber and a relatively small proportion of a higher mono alkyl or acyl derivative of a sulphuric acid ester of glycerine.

16. A rubber composition including rubber and a relatively small proportion of a higher fatty acid mono ester of glycerine mono-sulphate.

17. A rubber composition including rubber and a relatively small proportion of at least partially neutralized mono-coconut fatty acid esters of diethylene glycol sulphate.

18. A rubber composition including rubber and a relatively small proportion of an addition substance having the following general formula

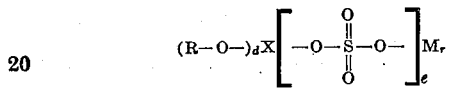

wherein R is an alkyl or acyl radical containing at least eight carbon atoms and preferably between twelve and eighteen carbon atoms, X represents the residue of a polyhydroxy substance which links together the alkyl or acyl radical and the sulphate group, M is a cation, and $d$, $e$ and $r$ are small whole numbers, at least one.

19. A rubber composition including rubber and a relatively small proportion of an addition substance having the following general formula

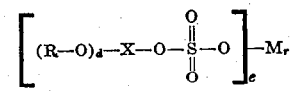

wherein R represents an alkyl or acyl radical containing at least eight carbon atoms, X is the residue of an aliphatic polyhydroxy substance which links together the alkyl or acyl radical and the sulphate group, M is a cation, and $d$, $e$ and $r$ are small whole numbers, at least one.

20. A rubber composition including rubber and a relatively small proportion of an addition substance having the following general formula

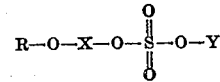

wherein R represents a higher fatty acid radical derived from fats and oils, X is the residue of a polyhydroxy substance, and Y is a cation.

ALBERT K. EPSTEIN.
BENJAMIN R. HARRIS.